(12) United States Patent
Jung et al.

(10) Patent No.: US 9,301,239 B2
(45) Date of Patent: Mar. 29, 2016

(54) METHOD AND APPARATUS FOR ACCESSING CELL IN WIRELESS COMMUNICATION SYSTEM

(71) Applicant: LG ELECTRONICS INC., Seoul (KR)

(72) Inventors: Sunghoon Jung, Anyang-si (KR);
Youngdae Lee, Anyang-si (KR);
Sungjun Park, Anyang-si (KR);
Seungjune Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/386,710

(22) PCT Filed: Mar. 22, 2013

(86) PCT No.: PCT/KR2013/002414
§ 371 (c)(1),
(2) Date: Sep. 19, 2014

(87) PCT Pub. No.: WO2013/141660
PCT Pub. Date: Sep. 26, 2013

(65) Prior Publication Data
US 2015/0079938 A1    Mar. 19, 2015

Related U.S. Application Data

(60) Provisional application No. 61/614,506, filed on Mar. 22, 2012.

(51) Int. Cl.
*H04W 48/20* (2009.01)
*H04W 48/08* (2009.01)
(Continued)

(52) U.S. Cl.
CPC .............. *H04W 48/08* (2013.01); *H04W 12/08* (2013.01); *H04W 48/06* (2013.01); *H04W 48/10* (2013.01); *H04W 48/20* (2013.01)

(58) Field of Classification Search
CPC ..... H04L 47/12; H04L 47/122; H04L 47/125; H04L 63/10; H04W 48/00; H04W 48/02; H04W 48/06; H04W 48/08; H04W 48/16; H04W 48/18; H04W 48/20; H04W 74/002
USPC ................................ 455/411, 26.1, 515, 516
See application file for complete search history.

(56) References Cited

U.S. PATENT DOCUMENTS

2011/0075661 A1\*   3/2011   Kevenaar et al. ............. 370/389
2011/0141908 A1    6/2011   Ishida et al.
(Continued)

FOREIGN PATENT DOCUMENTS

KR   10-2014-0039333   4/2014
WO   2013/022474      2/2013

OTHER PUBLICATIONS

3rd Generation Partnership Project (3GPP), "Technical Specification Group Services and System Aspects; Service accessibility (Release 11)," 3GPP TS 22.011 V11.2.0, Dec. 2011, 27 pages.
(Continued)

*Primary Examiner* — Siu Lee
(74) *Attorney, Agent, or Firm* — Lee, Hong, Degerman, Kang & Waimey

(57) ABSTRACT

Provided is an access method which is carried out by a terminal in a wireless communication system. The method comprises: obtaining system information from a target cell; determining whether system information for extended access barring (EAB) has been scheduled to the system information; determining whether EAB information is included in the system information for the EAB, when the system information for the EAB has been scheduled; and determining whether to bar access to the target cell on the basis of the EAB information when the EAB information is included.

14 Claims, 10 Drawing Sheets

(51) Int. Cl.
*H04W 48/06* (2009.01)
*H04W 12/08* (2009.01)
*H04W 48/10* (2009.01)

(56) References Cited

U.S. PATENT DOCUMENTS

| | | | |
|---|---|---|---|
| 2012/0040643 A1 | 2/2012 | Diachina et al. | |
| 2013/0045706 A1* | 2/2013 | Hsu | 455/404.1 |
| 2013/0115913 A1* | 5/2013 | Lin et al. | 455/410 |
| 2014/0036669 A1* | 2/2014 | Yang et al. | 370/230 |
| 2014/0080531 A1* | 3/2014 | Du et al. | 455/509 |
| 2014/0128029 A1* | 5/2014 | Fong et al. | 455/411 |
| 2014/0171096 A1* | 6/2014 | Hwang et al. | 455/452.1 |

OTHER PUBLICATIONS

Cheng, et al., "Prioritized Random Access with Dynamic Access Barring for RAN Overload in 3GPP LTE-A Networks," International Workshop on Machine-to-Machine Communications, Dec. 2011, 6 pages.
PCT International Application No. PCT/KR2013/002414, Written Opinion of the International Searching Authority dated Jun. 27, 2013, 1 page.
Rapporteur (Huawei), "[76#31]—Joint: EAB Information Update Procedure," 3GPP TSG-RAN WG2 Meeting #77, R2-120518, Feb. 2012, 10 pages.
Siemens AG, "Clarification of handling of System Information block 14," 3PP TSG-RAN WG2 Meeting #23, Tdoc R2-012093, Aug. 2001, 10 pages.
Intel Corp, "Further evaluation of EAB information update mechanisms with NAS backoff," 3GPP TSG RAN WG2 Meeting #77bis, R2-121748, Mar. 2012, 10 pages.
European Patent Office Application Serial No. 13764581.8, Search Report dated Nov. 26, 2015, 10 pages.
Korean Intellectual Property Office Application Serial No. 10-2014-7026005, Office Action dated Nov. 9, 2015, 4 pages.

* cited by examiner

METHOD AND APPARATUS FOR ACCESSING CELL IN WIRELESS COMMUNICATION SYSTEM

CROSS-REFERENCE TO RELATED APPLICATIONS

This application is the National Stage filing under 35 U.S.C. 371 of International Application No. PCT/KR2013/002414, filed on Mar. 22, 2013, which claims the benefit of U.S. Provisional Application Ser. No. 61/614,506, filed on Mar. 22, 2012, the contents of which are hereby incorporated by reference herein in their entirety.

BACKGROUND OF THE INVENTION

1. Field of the Invention

The present invention relates to wireless communication and, more particularly, to a method and apparatus for accessing a cell by a user equipment (UE) in a wireless communication system.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

User equipments (UEs) may move from a serving cell to a neighbor cell through a cell reselection procedure. Due to movement of UEs, the number of UEs accessing a particular cell may increase to cause overload in the corresponding cell. In order to prevent generation of overload, a wireless communication system provides a scheme of restricting an access. Restriction on UE's access to a particular cell is known as access barring.

Over a cell in which access barring is set, a UE determines whether its access is permitted based on access barring setting, and when not permitted, the UE may attempt to access a neighbor cell. When the UE is permitted to access the neighbor cell or the neighbor cell is not set with access barring, the UE may establish a connection with the corresponding neighbor cell.

In a communication system environment in which a great number of UEs coexist, when a UE access is not permitted due to access barring set for a particular cell, the UE may move to an accessible neighbor cell. In particular, a large number of UEs, which have failed to access due to access barring, may intend to establish a connection to a neighbor cell not set with access barring, which may cause excessive overload in the corresponding cell. Thus, a cell accessing method that may be able to prevent generation of unintentional overload in a particular cell is required.

SUMMARY OF THE INVENTION

The present invention provides a cell accessing method in a wireless communication system and an apparatus supporting the same.

In an aspect, a method for accessing carried out by a user equipment (UE) in a wireless communication system is provided. The method may include: obtaining system information from a target cell, determining whether system information for extended access barring (EAB) has been scheduled in the system information, when the system information for the EAB has been scheduled, determining whether EAB information is included in the system information for the EAB, and when the EAB information is included in the system information for EAB, determining whether accessing the target cell is barred on the basis of the EAB information.

The method may further include: when the system information for EAB has not been scheduled in the system information, determining that accessing the target cell is barred.

The method may further include: when it is determined that the system information for EAB has not been scheduled so accessing the target cell is barred, informing a higher layer that accessing is barred due to EAB.

The method may further include: when the system information for EAB has been scheduled and the EAB information is not included in the system information for EAB, determining that accessing the target cell is not barred.

The method may further include: when it is determined that the system information for EAB has been scheduled and the EAB information is not included in the system information for EAB so accessing the target cell is not barred, informing the higher layer that access barring due to EAB has been released.

The method may further include: when it is determined that accessing the target cell due to EAB is not barred, establishing radio resource control (RRC) connection with the target cell.

Establishing the RRC connection with the target cell may be performed in response to a service request triggered by the higher layer.

The UE may be barred from accessing a previous cell according to previous EAB information provided from the previous cell.

In another aspect, a wireless device operating in a wireless communication system is provided. The wireless device includes: a radio frequency (RF) unit configured to transmit and receive a radio signal, and a processor functionally coupled to the RF unit. The processor is configured to implement a first layer and a second layer as a higher layer of the first layer. The first layer is configured to obtain system information from a target cell, determine whether system information for extended access barring (EAB) has been scheduled in the system information, determine whether EAB information is included in the system information for EAB when the system information for EAB has been scheduled, and determine whether accessing the target cell is barred based on the EAB information when the EAB information is included in the system information for EAB.

In the cell accessing method according to embodiments of the present invention, an unexpected overload that may occur as UEs, which are camped on in a cell supporting EAB and which are barred from accessing, move to a cell not supporting EAB can be prevented. Thus, service reliability and efficiency of the wireless communication system can be enhanced.

DESCRIPTION OF EXEMPLARY EMBODIMENTS

Figure 1:
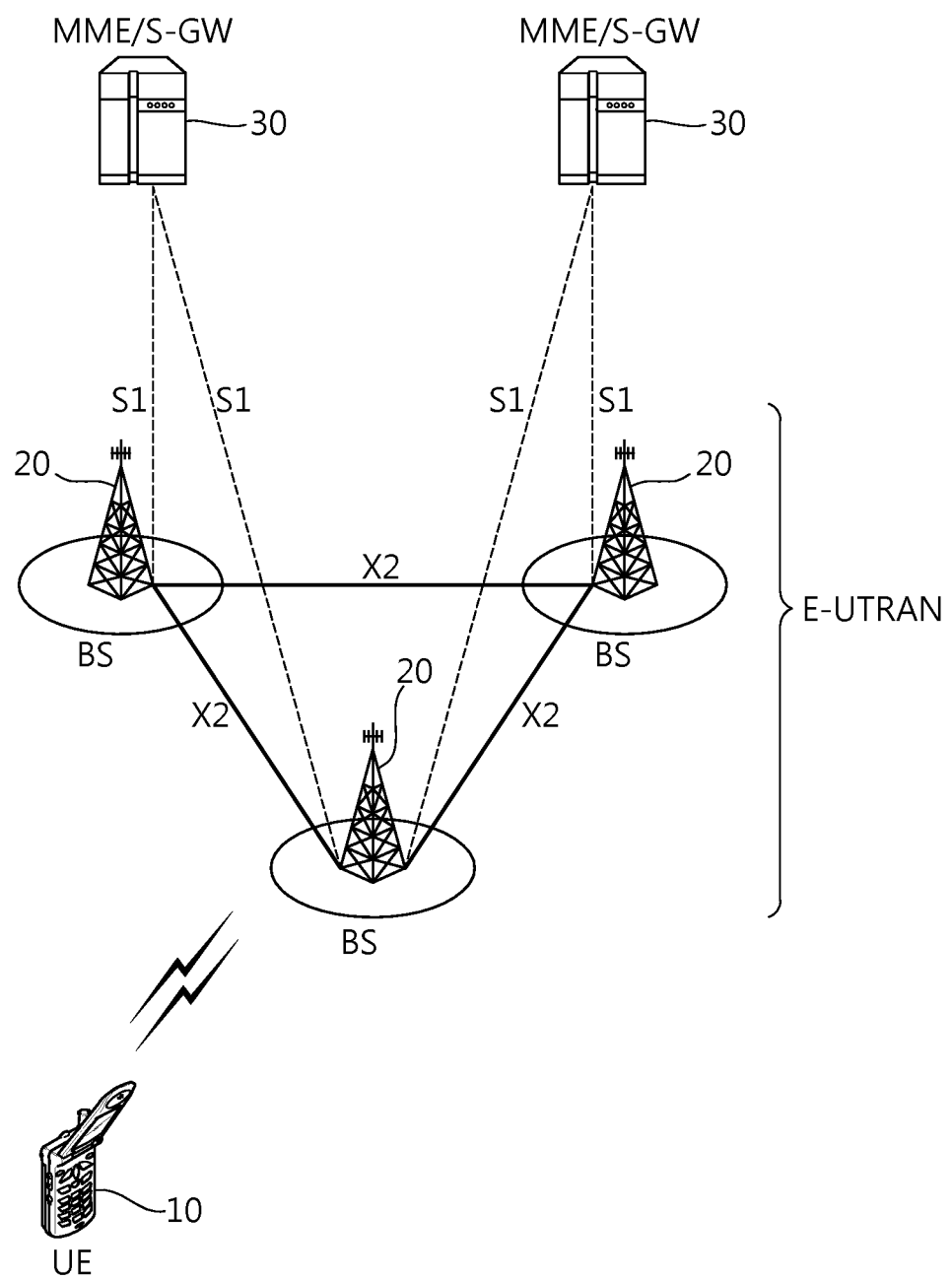
FIG. 1 illustrates a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
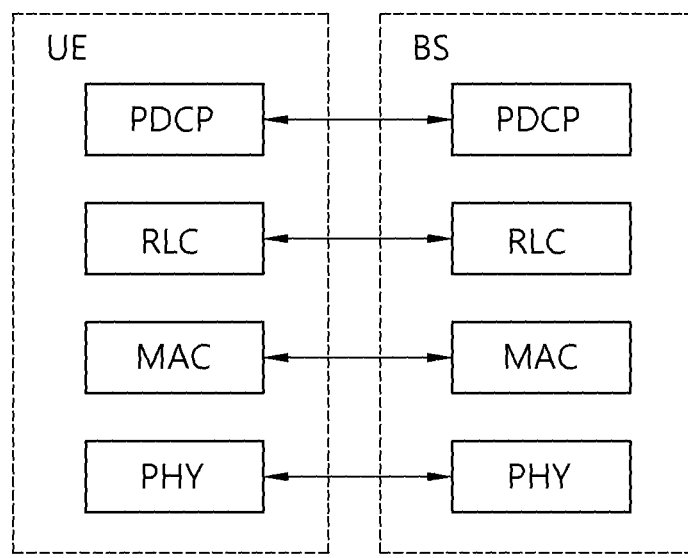
FIG. 2 is a block diagram showing the structure of a wireless protocol on the user plane.
Figure 3:
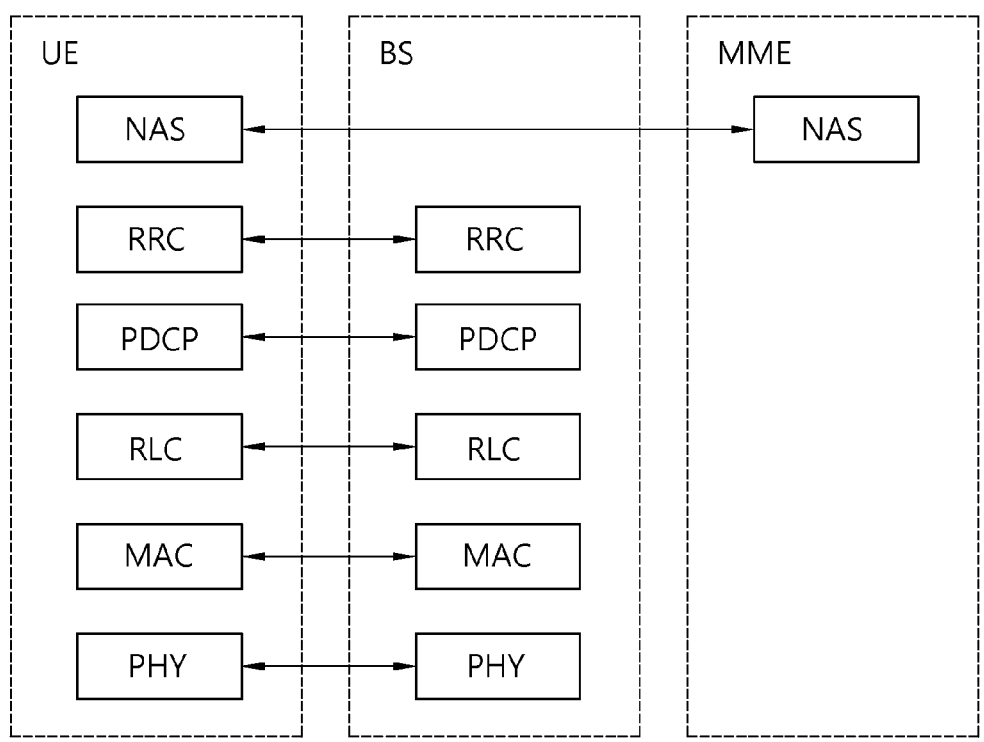
FIG. 3 is a block diagram showing the structure of a wireless protocol on the control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is transferred via a physical channel between different physical layers, namely, physical layers of a transmitter and a receiver. The physical channel may be modulated according to an orthogonal frequency division multiplexing (OFDM) scheme and utilizes time and frequency as radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

The RRC layer is defined only in a control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

The setup of the RB implies a process for specifying a radio protocol layer and channel properties to provide a particular service and for determining respective detailed parameters and operations. The RB can be classified into a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block, a resource allocation unit, includes a plurality of OFDM symbols and a plurality of sub-carriers. Further, each subframe may use specific sub-carriers of OFDM symbols (e.g., a OFDM first symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Figure 4:
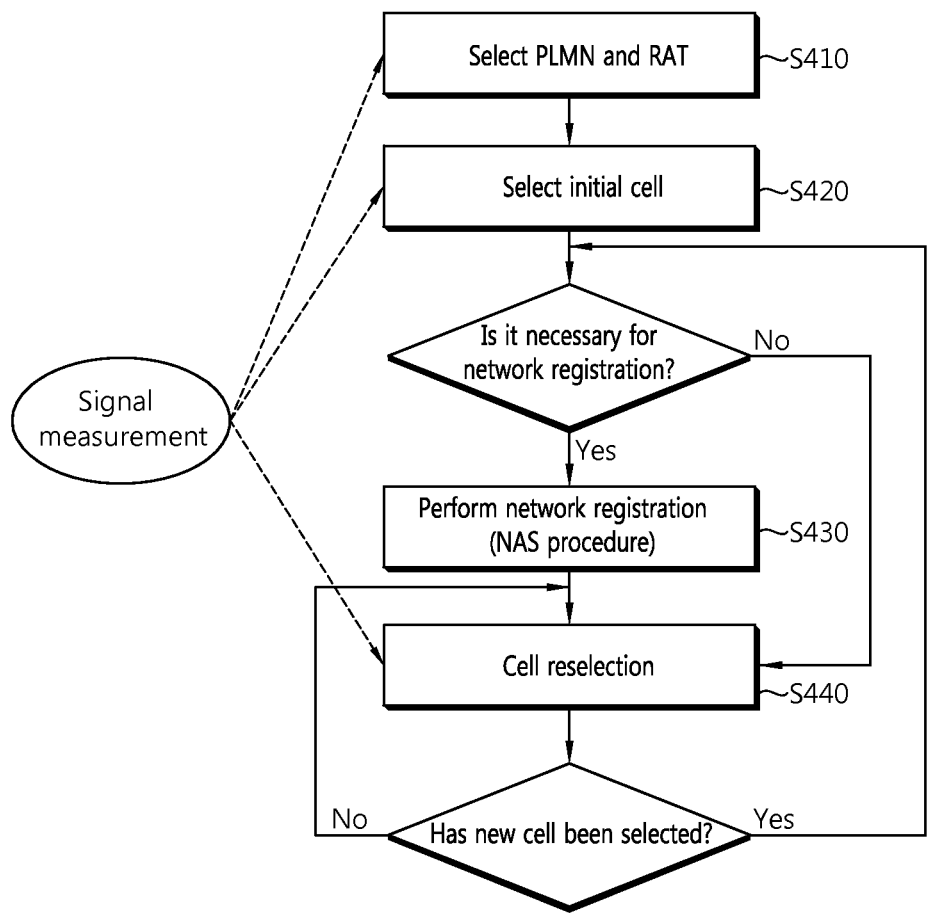
FIG. 4 is a flow chart illustrating an operation of a user equipment (UE) in an RRC idle state.

FIG. 4 is a flow chart illustrating an operation of a UE in an RRC idle state. Specifically, FIG. 4 shows a procedure in which a UE is registered to a network through a cell selection process when power of the UE is turned on, and a cell re-selection is performed when necessary.

Referring to FIG. 4, the UE selects a radio access technology (RAT) for communicating with a PLMN (public land mobile network) as a network the UE wants to receive a service therefrom (S410). Information regarding the PLUM and RAT may be selected by a user of the UE, or that stored in a USIM (universal subscriber identity module) may be used.

The UE selects a cell having the greatest value among cells in which signal strength or quality thereof is greater than a particular value (S420). This is performed by a UE as power thereof is turned on, which may be called an initial cell selection. The cell selection procedure will be described later. After the cell selection, the UE receives system information periodically transmitted by a BS. The particular value refers to a value defined in the system in order to guarantee quality of a physical signal in data transmission and reception. Thus, it may vary according to an applied RAT.

When a network registration is required, the UE performs a network registration procedure (S430). In order to receive a service (e.g., paging) from the network, the UE registers its information (e.g., an IMSI). The UE is not registered to a network whenever a cell is selected, and registered to a network when information (e.g., tracking area identity (TAI)) of a network received from the system information and information of a network the UE knows are different.

The UE performs cell re-selection based on a service environment provided in a cell, a UE environment, or the like (S440). When signal strength or quality value measured from a BS serving the UE is lower than a value measured from a BS of an adjacent cell, the UE selects one of cells providing better signal characteristics than that of the cell of the BS the UE has accessed. This process is called a cell re-selection, discriminated from initial cell selection performed twice. Here, in order to prevent a cell is frequently re-selected according to a change in signal characteristics, a temporal constraint is provided. The cell re-selection procedure will be described later.

Figure 5:
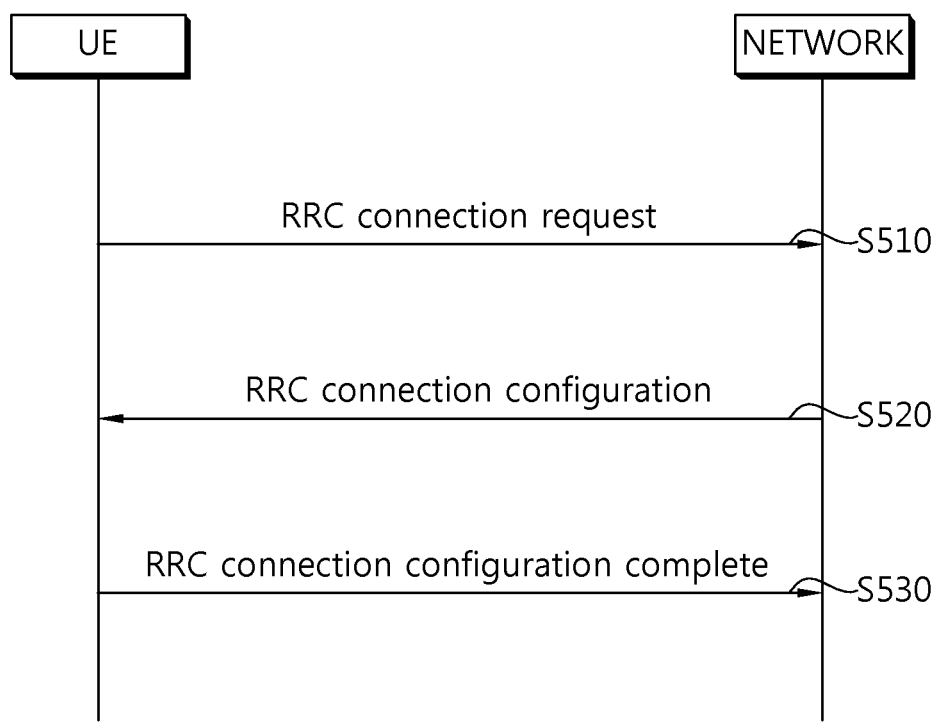
FIG. 5 is a flow chart illustrating a process of establishing an RRC connection.

FIG. 5 is a flowchart showing an RRC connection establishment procedure.

A UE sends to a network an RRC connection request message for requesting an RRC connection (step S510). The network sends an RRC connection setup message in response to the RRC connection request (step S520). After receiving the RRC connection setup message, the UE enters an RRC connection mode.

The UE sends to the network an RRC connection setup complete message used to confirm successful completion of the RRC connection establishment (step S530).

Figure 6:
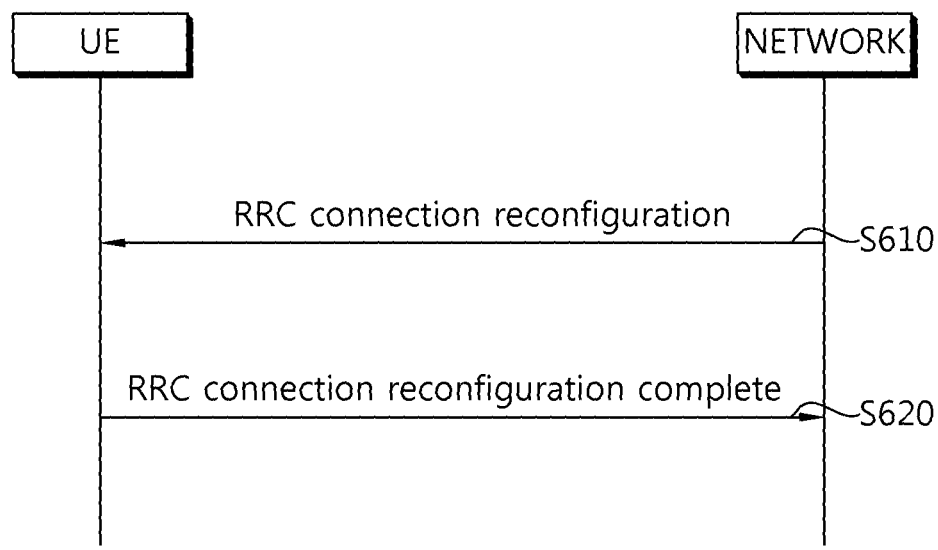
FIG. 6 is a flow chart illustrating a process of reconfiguring an RRC connection.

FIG. 6 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S610). In response to the RRC connection reconfiguration, the UE sends to the network an RRC connection reconfiguration complete message used to confirm successful completion of the RRC connection reconfiguration (step S620).

Hereinafter, a public land mobile network (PLMN) will be described.

A PLMN is a network disposed and operated by a mobile network operator. Each mobile network operator operates one or more PLMNs. Each PLMN may be identified by a mobile country code (MCC) and a mobile network code (MNC). PLMN information of a cell is included in system information and broadcast.

In PLMN selection, cell selection, and cell reselection, various types of PLMNs may be considered by a UE.

HPLMN (Home PLMN): PLMN having an MCC and an MNC matched to an MCC and an MNC of a UE IMSI.

EHPLMN (Equivalent HPLMN): PLMN handled as being equivalent to HPLMN

RPLMN (Registered PLMN): PLMN successfully finished for location registration

EPLMN (Equivalent PLMN): PLMN handled as being equivalent to RPLMN

Consumers of each mobile service subscribed to an HPLMN. When a general service is provided for a UE by an HPLMN or an EHPLMN, the UE is not in a roaming state. On the other hand, when a service is provided for a UE by a PLMN other than the HPLMN or EHPLMN, the UE is in a roaming state and the PLMN is called a VPLMN (visited PLMN).

When power is initially turned on, the UE searches for available PLMNs and selects a suitable PLMN to receive a service. The PLMNs are networks deployed or operated by a mobile network operator. Each mobile network operator may operate one or more PLMNs. Each PLMN may be identified by a mobile country code (MCC) or a mobile network code (MNC). PLMN information of a cell is included in system information and broadcast. The UE attempts to register a selected PLMN. When the registration is successful, the selected PLMN becomes a registered PLMN. The network may signal a PLMN list to the UE, and here, PLMNs included in the PLMN list may be considered as PLMNs such as RPLMNs. The UE registered to the network is reachable by the network any time. If the EU is in an ECM-CONNECTED state (or in an RRC connected state), the network recognizes that the UE is served. However, in a case in which the UE is in an ECM-IDLE state (or in an RRC idle state), the situation of the UE is stored in the MME, although not valid in an eNB. In this case, a location of the UE in the ECM-IDLE state may be informed only to the MME, by granularity of a list of tracking areas (TAs). A single TA is identified by a tracking area identity (TAI) configured as a PLMN identifier to which a TA belongs and a tracking area code (TAC) solely expressing a TA within a PLMN.

Subsequently, the UE selects a cell having signal quality and property capable of receiving a suitable service among the cells provided by the selected PLMN.

Next, a procedure for selecting a cell by a UE will be described in detail.

If the UE is turned on or is camped on a cell, the UE may perform procedures for selecting/reselecting a cell having suitable quality in order to receive a service.

The UE in an RRC idle state needs to be ready to receive the service through the cell by selecting the cell having suitable quality all the time. For example, the UE that has been just turned on must select the cell having suitable quality so as to be registered into a network. If the UE that has stayed in an RRC connected state enters into the RRC idle state, the UE must select a cell on which the UE itself is camped. As such, a process of selecting a cell satisfying a certain condition by the UE in order to stay in a service waiting state such as the RRC idle state is called a cell selection. The cell selection is performed in a state that the UE does not currently determine a cell on which the UE itself is camped in the RRC idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.5.0 (2009-03) "User Equipment (UE) procedures in idle mode (Release 8)", a method and procedure for selecting a cell by a UE in 3GPP LTE will be described in detail.

A cell selection process can be classified into two processes.

A first process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

Next, the UE may select a cell by utilizing information broadcast in a cell. Thus, a cell may be promptly selected, compared to the initial cell selection process. When the UE discovers a cell that satisfies the cell selection reference, the UE selects the corresponding cell. If the UE fails to find an appropriate cell that satisfies the cell selection reference through this process, the UE performs the initial cell selection process.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, the UE measures quality of a serving cell and a neighboring cell for a cell reselection.

Second, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE. Cell re-selection priority provided through broadcast signaling may be called common priority. Cell re-selection priority set by the network for each UE may be called dedicated priority. When the UE receives dedicated priority, the UE may receive validity time related to the dedicated priority together. Upon receiving the dedicated priority, the UE initiates a validity timer set to the validity time received together. While the validity timer operates, the UE applies the dedicated priority in an RRC idle state. When the validity timer expires, the UE deletes the dedicated priority, and thus, the UE applies the common priority.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 1 below.

$$R_S = Q_{meas,s} + Q_{hyst}, R_n = Q_{meas,n} - Q_{offset}$$

Here, $R_s$ denotes a ranking value of a serving cell, $R_n$ denotes a ranking criterion of a neighboring cell, $Q_{meas,s}$ denotes a quality value measured for the serving cell by the UE, $Q_{meas,n}$ denotes a quality value measured for the neighboring cell by the UE, $Q_{hyst}$ denotes a hysteresis value for ranking, and $Q_{offset}$ denotes an offset between two cells.

In the intra-frequency cell reselection, if the UE receives an offset $Q_{offsets,n}$ between the serving cell and the neighboring cell, $Q_{offset} = Q_{offsets,n}$, and when the UE does not receive the offset $Q_{offsets,n}$, $Q_{offset} = 0$.

In the inter-frequency cell reselection, if the UE receives the offset $Q_{offsets,n}$, $Q_{offset} = Q_{offsets,n} + Q_{frequency}$, and when the UE does not receive the offset $Q_{offsets,n}$, $Q_{offset} = Q_{frequency}$.

If the ranking criterion $R_s$ of the serving cell and the ranking criterion $R_n$ of the neighboring cell are not much different from each other and constantly vary, ranking orders of the serving cell and the neighboring cell may change frequently. Thus, the serving cell and the neighboring cell may be reselected alternately while changing their ranking orders frequently. In order to prevent the UE from reselecting two cells alternately, the hysteresis value $Q_{hyst}$ is used to give a hysteresis in the cell reselection.

The UE measures the ranking criterion $R_s$ of the serving cell and the ranking criterion $R_n$ of the neighboring cell according to the above equation. A cell having the greatest ranking criterion value is reselected by considering this cell as a best-ranked cell.

In the above-mentioned cell reselection criterion, the quality of cells is considered as a most important factor when performing the cell reselection. If a reselected cell is not a suitable cell, the UE excludes the reselected cell or a frequency of the reselected cell from targets of the cell reselection.

Hereinafter, radio link monitoring (RLM) will be described.

In order to sense downlink radio link quality of a PCell, a UE monitors downlink quality based on a cell-specific reference signal. For the purpose of monitoring downlink radio link quality of a PCell, the UE may estimate downlink radio link quality and compares it with a threshold value Qout and Qin. The threshold value Qout is defined as a level at which a downlink radio link cannot be stably received, which corresponds to a 10% block error rate of a hypothetical PDCCH transmission in consideration of a PDFICH error. The threshold value Qin is defined as a downlink radio link quality level at which a downlink radio link is stably received compared with the threshold value Qout, which corresponds to a 2% block error rate of a hypothetical PDCCH transmission in consideration of a PDFICH error.

Now, radio link failure (RLF) will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

In the specification of 3GPP LTE, normal communication cannot be performed in the following conditions.

When a UE determines that there is a serious problem with a downlink communication link quality based on radio quality measurement result of a physical layer of the UE (when it is determined that quality of a PCell is low during RLM).

When it is determined that there is a problem with an uplink transmission as a random access procedure fails continuously in a MAC sub-layer.

When it is determined that there is a problem with an uplink transmission as an uplink data transmission continuously fails in an RLC sublayer.

When it is determined that handover has failed.

When a message received by the UE does not pass integrity check.

Hereinafter, an RRC connection re-establishment procedure will be described in detail.

Figure 7:
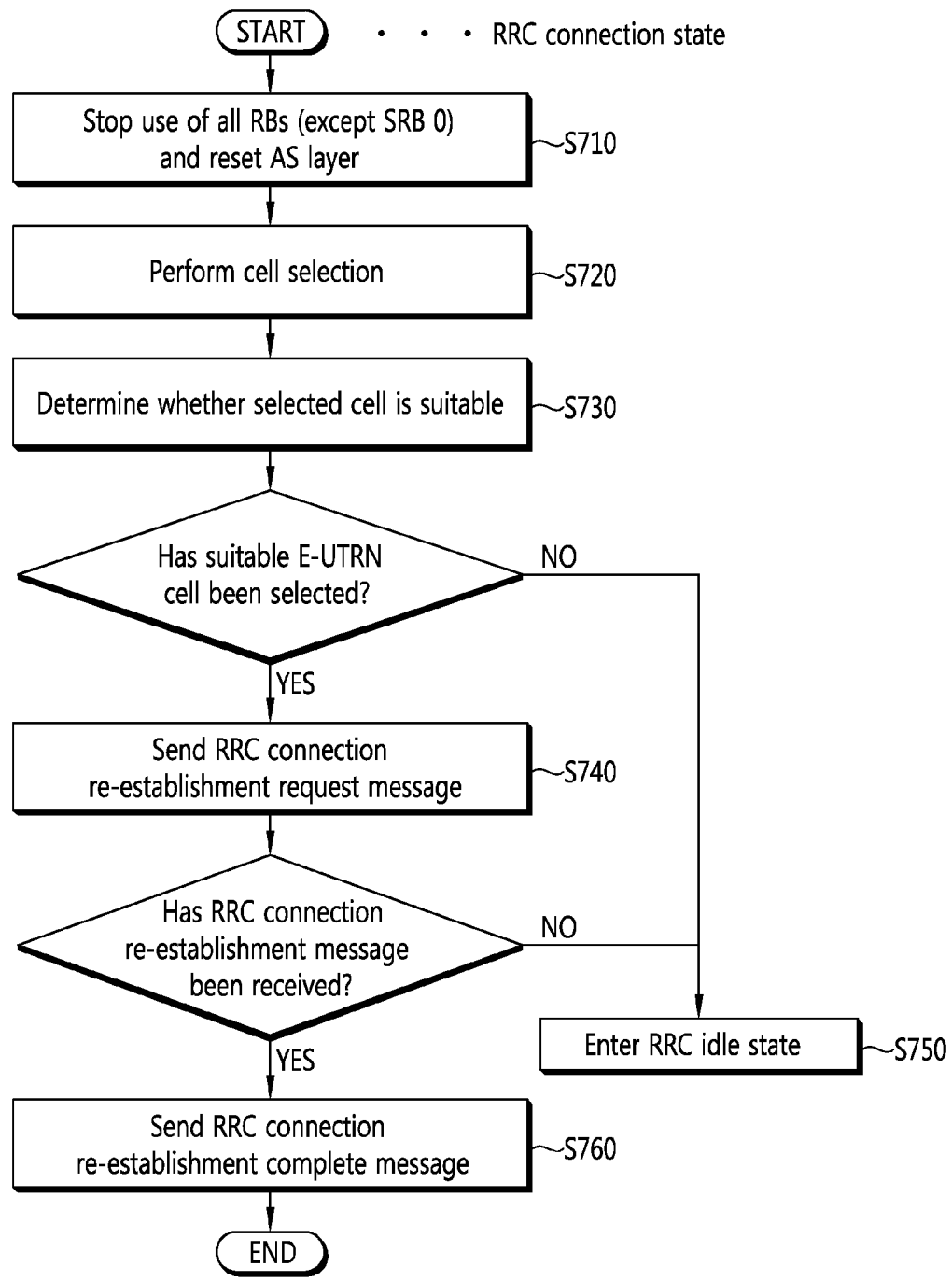
FIG. 7 is a flow chart illustrating a process of re-establishing an RRC connection.

FIG. 7 is a flow chart illustrating an RRC connection re-establishment procedure.

Referring to FIG. 7, a UE stops using of all the set radio bearers excluding SRB0 (Signaling Radio Bearer #0), and initializes various sub-layers of an access strantum (S710). Also, the UE sets each sub-layer and physical layer as a default configuration. During this process, the UE is maintained in an RRC connected state.

The UE performs a cell selection procedure to perform an RRC connection re-establishment procedure (S720). Although the UE is maintained in the RRC connected state, the cell selection procedure included in the RRC connection re-establishment procedure may be performed in the same manner as the cell selection procedure performed by the UE in an RRC idle state.

After performing the cell selection procedure, the UE checks system information of a corresponding cell to determine whether or not the corresponding cell is an appropriate cell (S730). When the selected cell is determined to be an appropriate E-UTRAN cell, the UE transmits an RRC connection reestablishment request message to the corresponding cell (S740).

Meanwhile, when it is determined that the cell selected through the cell selection procedure to perform an RRC connection re-establishment procedure is a cell that uses an RAT other than the E-UTRAN, the RRC connection re-establishment procedure is stopped and the UE enters an RRC idle state (S750).

The UE may be implemented to finish checking appropriateness of a cell within a limited time through the cell selection procedure and reception of system information of a selected cell. To this end, the UE may drive a timer when an RRC connection re-establishment procedure starts. The timer may be stopped when the UE determines that an appropriate cell has been selected. When the timer expires, the UE may determine that the RRC connection reestablishment procedure has failed and enters an RRC idle state. The timer will be referred to as a radio link failure timer hereinafter. In the LTE specification TS 36.331, a timer named T311 may be utilized as a radio link failure timer. The UE may obtain a set value of the timer from system information of a serving cell.

When the cell receives an RRC connection re-establishment request message from the UE and accepts the request, the cell transmits an RRC connection reestablishment message to the UE.

Upon receiving the RRC connection reestablishment message from the cell, the UE reconfigures a PDCP sublayer and an RLC sublayer with respect to an SRB1. Also, the UE re-calculates various key values in relation to security setting, and re-configures a PDCP sublayer responsible for security with newly calculated security key values. Through this, the SRB1 between the UE and the CELL is open, and an RRC control message may be exchanged. The UE completes resuming of the SRB1, and transmits an RRC connection reestablishment complete message indicating that the RRC connection reestablishment procedure was completed to the cell (S760).

Meanwhile, upon receiving the RRC connection reestablishment request message, if the cell does not accept the request, the cell transmits an RRC connection reestablishment reject message to the UE.

When the RRC connection reestablishment procedure is successfully performed, the cell and the UE performs an RRC connection reconfiguration procedure. Through this, the UE may recover the state before the RRC connection reestablishment procedure was performed and continuity of a service is guaranteed to its maximum level.

Hereinafter, reporting of RLF will be described.

When RLF occurs or handover failure occurs, a UE reports such a failure event to a network in order to support mobility robustness optimization (MRO) of a network.

After RRC connection is reestablished, the UE may provide an RLF report for an eNB. A wireless measurement included in the RLF report may be used as a potential reason of failure to identify coverage problems. By excluding such events from the MRO evaluation regarding intra-LTE mobility connection failure, the information may be used to borrow the events as inputs with respect to other algorithms.

In a case in which an RRC connection reestablishment fails or in a case in which the UE fails to perform RRC connection reestablishment, the UE may be reconnected in an idle mode and generate a valid RLF report with respect to an eNB. To this end, the UE may store the most recent RLF or handover failure-related information, and until when an RLF report is called by the network or for 48 hours since the RLF or handover failure has been detected, the UE may indicate to an LTE cell that the RLF report is valid each time an RRC connection is (re)established and each time handover is performed.

The UE maintains the information during a state transition and RAT change, and after being returned to an LTE RAT, the UE indicates that the RLF report is valid.

Validity of the RLF report during the RRC connection configuration procedure indicates that the UE has been interfered with such as a connection failure and an RLF report due to the failure has not been delivered to the network yet. The RLF report from the UE includes the following information.

- E-CGI of a final cell (in case of RLF) which had provided a service to the UE or a target of handover. If E-CGI has not been known, PCI and frequency information is used instead.
- E-CGI of a cell for which reestablishment has been attempted.
- E-CGI of a cell which had provided a service to the UE when finial handover was initialized, for example, when a message 7 (RRC connection reconfiguration) is received by the UE.
- Time which has passed from final handover initialization to connection failure.
- Information indicating whether connection failure is due to RLF or due to handover failure.
- Wireless measurements.
- Position of failure.

Upon receiving the RFL failure from the UE, an eNB may forward the report to the eNB which has provided a service to the UE before the reported connection failure. Wireless measurements included in the RLF report may be used to identify coverage issues as potential causes of wireless link failure. This information may be used to exclude such events from the MRO evaluation of the intra-LTE mobility connection failure and sends the events again as an input to a different algorithm.

Hereinafter, extended access bearing (EAB), one of access barring schemes, will be described.

EAB is a mechanism for controlling by an operator to control mobile originating (MO) access attempt by UEs set with EAB, through which overload of an access network and/or core network may be prevented. In a congested environment, an operator may bar UEs set with EAB from accessing, while permitting accessing of other UEs. Here, a UE set with EAB may refer to a UE that is provided with EAB-related information from a cell and barred from accessing a cell according to a category corresponding to the UE and an access class of the UE. EAB may be set for a UE by itself or may be set though setting signaling of a higher layer. A UE set with EAB may be considered to be tolerant for access barring, relative to a UE not set with EAB.

When the operator determines that a UE is appropriate to be applied EAB, a network broadcasts required information to provide EAB for the UE in a particular area. The following is required for applying EAB.

- EAB is set for a UE by HPLMN.
- EAB may be applied all of 3GPP RAT.
- EAB may be applied regardless of whether a UE is in an HPLMN or VPLMN.
- Network may broadcast EAB information.
- EAB information may be defined by one of following categories in relation to whether EAB is applied to a UE.
  a) UE set with EAB
  b) UE set with EAB and not in an HPLMN and a PLMN equivalent to HPLMN
  c) UE set with EAB and not in a PLMN listed as the most preferred PLMN of a country in which the UE is roaming, in an operator-defined PLMN selector list on SIM/USIM.
- EAB information may further include extended barring information with respect to access class 0 to 9.
- UE set with EAB uses allocated access class (AC) in determining whether accessing a corresponding network is barred, by determining EAB information broadcast from a network.

EAB information may be included in system information broadcast by a cell and transmitted. As described above, system information may include a plurality of SIBs and transmitted. The EAB information may be included in SIB 14 of system information. Thus, the SIB 14 may be expressed as system information for EAB hereinafter. Meanwhile, EAB information that may be included in the system information may be implemented as shown in Table 1 below.

TABLE 1

| Parameter | Contents |
| --- | --- |
| eab_Category | It indicates a category of a UE to which EAB is applied. a is a value indicating every UE. b is a value indicating UEs not in an HPLMN and a PLMN equivalent to the HPLMN, c is a value indicating a UE is not in a PLMN listed as the most preferred PLMN of a country in which the UE is roaming in an operator-defined PLMN selector list of an SIM/USIM, and not in an HPLMN and a PLMN equivalent to the HPLMN. |
| eab_BarringBitmap | It is a bit map sequence indicating EAB with respect to AC 0 to 9. A first bit (the leftmost) is a bit for AC 0, a second bit is a bit for AC 1, and the remainders are bits for remaining AC. | eab_Category and eab_BarringBitmap parameters may be included in EAB information commonly applied to every PLMN and/or EAB information applied to a particular PLMN. The commonly applied EAB information may be called common EAB information. EAB information may include EAB common information and/or PLMN-dedicated EAB information. Meanwhile, an EAB PLMN list for indicating at least one PLMN to which PLMN-dedicated EAB information is applied may be further included in the EAB information.

The UE may obtain EAB information through system information and determine whether a corresponding cell is access-barred due to EAB.

When common EAB information is included in EAB information, first, based on eab_Category parameter of the common EAB information, the UE determines whether the UE is in a category indicated by the corresponding parameter. The UE determines whether a bit corresponding to AC allocated to the UE has been set to 1 based on eab_BarringBitmap of the common EAB information. When the condition is met, the UE may determine that the corresponding cell is access-barred due to EAB.

When an EAB PLMN list is included in the EAB information, the UE checks an entry of the list. When the corresponding cell is related to at least one PLMN indicated by the EAB PLMN list, the UE determines whether access to a corresponding cell is barred based on the eab_Category parameter and eab_BarringBit map of the PLMN-dedicated EAB information.

Meanwhile, a UE may be camped on in a cell (cell_s) supporting EAB and a neighboring cell (cell_n) not supporting EAB may exist around the cell. Also, the cell_s and cell_n may belong to different two operators and the two operators may permit mutual roaming.

In such an environment, when the cell_s in which the UE is currently camped on is overloaded, the corresponding cell may signal EAB information to the UE to bar accessing. In this case, the cell_s may broadcast EAB information. The UE may receive the EAB information and performs barring check according to the received EAB information. For example, the UE may determine that accessing the corresponding cell (cell_s) has been barred. Thus, the UE may perform cell reselection and detect that a neighbor cell not supporting EAB exists.

In the foregoing communication environment, when a cell (cell_n) supports EAB, the cell_n may broadcast EAB information to inform the UE as to whether accessing is barred, and accordingly, undesired accessing of the UE may be barred.

Meanwhile, the neighbor cell (cell_n) may not support EAB, and in this case, the cell_n may not broadcast system information for EAB. Thus, the UE cannot obtain EAB information from the cell_n. Thus, the UE may determine that the corresponding cell is not a cell that bars accessing in terms of EAB, and attempt to establish RRC connection to the corresponding cell.

In a case in which there are many UEs set with EAB in the cell_s and accessing of the corresponding UEs is barred, the UEs may move to the neighbor cell_n and determine whether accessing is barred due to EAB. Since the cell_n does not support EAB, the UEs may attempt to establish RRC connection. This may cause overload due to the unexpected UEs.

As described above, a cell not supporting EAB may be overloaded unexpectedly by the UEs that have been barred from accessing a cell supporting EAB. In order to solve this problem, an enhanced EAB-based access controlling method is required to be provided.

The present invention proposes a method in which, when a UE, camped on in a first cell, moves to a second cell, the UE performs checking in relation to EAB, and determines whether to access a corresponding cell. In this case, the UE may determine 1) whether the second cell broadcasts system information for EAB based on whether the first cell has obtained EAB information, and 2) whether accessing is barred according to the EAB information included in system information for EAB when the system information is broadcast. This will be described in detail hereinafter.

A UE, which has never obtained EAB information from the first cell, does not determine whether accessing is barred based on EAB with respect to the first cell. Thus, when the UE has moved to the second cell, only when EAB information is broadcast from the second cell, the UE determines whether accessing the second cell is barred based on the EAB information.

On the other hand, a UE, which has first obtained EAB information from the first cell, determines whether system information for EAB is broadcast, whether EAB information is included in the system information, and whether accessing the second cell is barred according to configuration of the EAB information. This will be described in detail with reference to FIG. 8 hereinafter.

Figure 8:
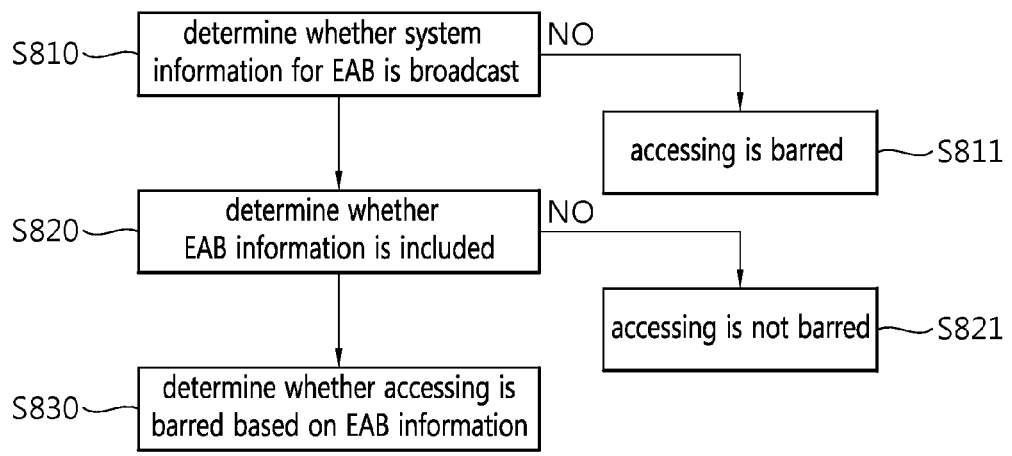
FIG. 8 is a view illustrating a cell accessing method according to an embodiment of the present invention.

FIG. 8 is a view illustrating a cell accessing method according to an embodiment of the present disclosure.

In the example of FIG. 8, it is assumed that a UE determines whether accessing a second cell is barred and has previously obtained EAB information from a first cell. Also, it is assumed that EAB information has not released yet.

Referring to FIG. 8, the UE determines whether system information for EAB is broadcast from the second cell selected through cell selection and/or reselection (S810). In this case, the UE may determine whether system information for EAB is broadcast by checking whether an SIB 14 has been scheduled in the broadcast system information. When system information for EAB is not broadcast from the second cell, the UE may determine that accessing the second cell is barred (S811).

Upon determining that accessing the second cell is barred, an AS layer of the UE may perform particular signaling to an NAS, a higher layer. In the case in which accessing a target cell is barred due to EAB, the AS layer may perform signaling indicating that accessing is barred due to EAB, to the NAS layer.

Meanwhile, in a state in which the UE has already received the EAB from the first cell, when the UE determine that accessing is barred because system information for EAB has not been broadcast, the UE may omit signaling from the AS to the NAS. Namely, in a case in which the AS layer has signaled to the NAS layer that accessing the previous cell 1 has been barred and has not signaled to the NAS that accessing the second cell 2 has been barred, the AS layer may not signal to the NAS layer that accessing has been barred due to EAB. This is because until before signaling that access barring due to EAB is released, the NAS layer continue to assume that accessing has been barred due to EAB.

When system information is broadcast from the second cell, the UE determines whether EAB information is included in the system information for EAB (S820). In this case, the UE may determine whether EAB information is included in SIB 14. When EAB information is not included in the system information, the UE may determine that accessing the second cell has not been barred (S821). Thus, the UE may attempt to establish RRC connection to the second cell.

When the UE determines that accessing the second cell is not barred, the UE may perform particular signaling to the NAS, a higher layer, by itself. In this case, the AS layer may perform signaling indicating that access barring due to EAB has been released, to the NAS layer.

In a case in which EAB information is included in the system information, the UE determines whether accessing the second cell 2 is barred based on the EAB information (S830). Determining by the UE whether accessing is barred based on the EAB information has been described above, so a detailed description thereof will be omitted.

Determining that accessing the second cell is barred, the UE may perform particular signaling to the NAS, a higher layer, by itself. In this case, the AS layer may perform signaling indicating that the corresponding cell is barred due to EAB, to the NAS layer.

Figure 9:
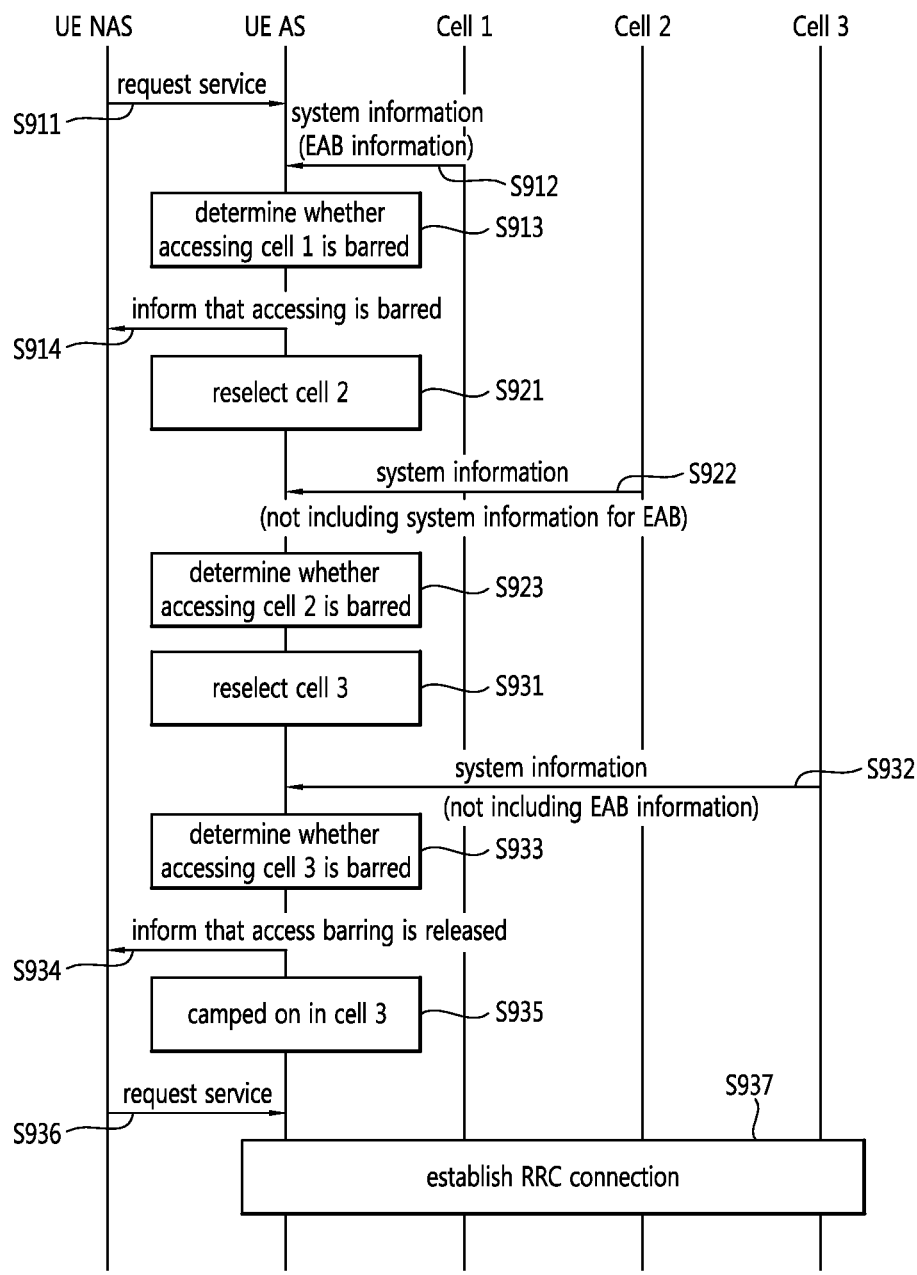
FIG. 9 is a view illustrating an example of an accessing method according to an embodiment of the present invention.

FIG. 9 is a view illustrating an example of an accessing method according to an embodiment of the present invention.

In the example of FIG. 9, it is assumed that the cell is connected with a plurality of UEs, so it is overloaded due to congestion. It is assumed that the cell 1 supports EAB and broadcasts system information including EAB information according to the overload of the cell 1. It is assumed that the cell 2 does not support EAB and does not broadcast system information for EAB. It is assumed that a cell 3 supports EAB and broadcasts system information for EAB not including EAB information.

Referring to FIG. 9, an NAS layer of a UE camped on in the cell 1 triggers a service request (S911).

The UE obtains EAB information of system information broadcast from the cell 1 (S912) and determines whether accessing the cell 1 is barred based on the obtained EAB information (S913). Determining by the UE whether accessing a particular cell is barred due to EAB has been described above.

The UE may determine that accessing the cell 1 is barred based on the EAB information. In this case, the AS layer of the UE informs the NAS layer that accessing is barred due to EAB (S914).

The UE determines the cell 2 as a target cell through a cell reselection procedure (S921).

The UE receives system information from the cell 2 (S922), and determines whether accessing the cell 2 is barred (S923). The UE may check that system information for EAB is not scheduled in the received system information, and determine that accessing the cell 2 is barred due to EAB.

In the case in which accessing the corresponding cell is barred because system information for EAB is not broadcast, the AS layer of the UE may omit signaling related to access barring, to the NAS layer, and may signal that accessing is barred due to EAB, to the NAS layer.

The UE determines the cell 3 as a target cell through a cell reselection procedure (S931).

The UE obtains system information from the cell 3 (S932) and determines whether accessing the cell 3 is barred (S933). When the UE checks that, although the system information has been obtained, the system information does not include EAB information, the UE may determine that accessing the cell 3 is not barred.

The AS layer of the UE informs the NAS layer that accessing the cell 3 is not barred (S934). The AS layer of the UE may signal that access barring due to EAB has been released, to the NAS layer of the UE.

The UE is camped on in the cell 3 to which accessing is not barred (S935).

When the NAS layer triggers a service request (S936), the UE may perform a procedure to establish RRC connection with the cell 3 (S937).

On the other hand, although the UE determines that accessing the cell 3 is not barred due to EAB, if the NAS layer of the UE does not trigger a service request, the UE may not establish RRC connection with the cell 3. This corresponds to a case in which a triggered service request is not validated by access barring due to EAB.

Meanwhile, in a case in which it is assumed that a previously triggered service request is valid in spite of access barring due to EAB, RRC connection with the cell 3 may be established even though the NAS layer does not trigger a service request.

In the cell accessing method according to an embodiment of the present invention as described above, a UE may determine a cell based on RAT, rather than E-UTRAN, as a target cell. In this case, whether the corresponding cell is accessing-barred due to EAB may be an issue. The present invention proposes that, when a UE obtains EAB information in a cell of a particular RAT and subsequently moves to a cell of a different RAT, the UE determines whether it is accessing-barred based on a previously obtained EAB cell. When the UE determines that it is barred from accessing the cell of the different RAT, the AS layer of the UE may signal to the NAS layer that accessing is barred. Also, when the UE determines that accessing is not barred, the AS layer of the UE may inform NAS layer that accessing is not barred. This may inform that access barring by EAB has been released.

Meanwhile, alternatively, when the UE selects a new cell of a different RAT as a target cell, the AS layer of the UE may signal to the NAS layer that existing access barring due to EAB has been basically released.

In the cell accessing method according to an embodiment of the present invention, unexpected overload that may occur as UEs, which are camped on a cell supporting EAB and barred from accessing due to EAB, move to a cell not supporting EAB. Thus, service reliability and efficiency of the wireless communication system can be enhanced.

Figure 10:
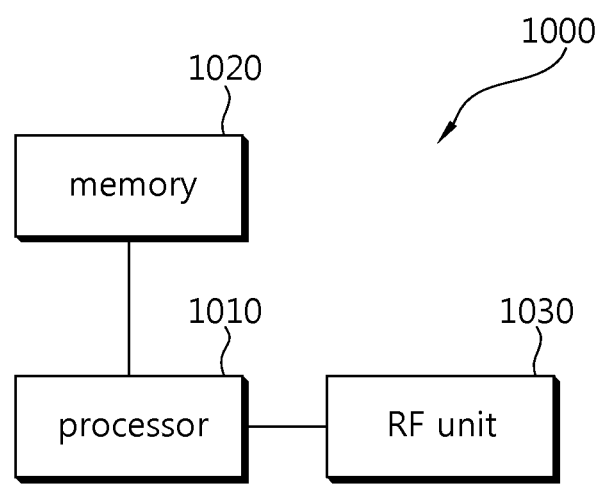
FIG. 10 is a block diagram illustrating a wireless device implementing an embodiment of the present invention.

FIG. 10 is a block diagram of a wireless device implementing an embodiment of the present invention. The wireless device may implement an operation of the cell accessing method according to the embodiment described above with reference to FIGS. 8 and 9.

The wireless device 1000 includes a processor 1010, a memory 1020, and an RF unit 1030. The processor 1010 implements the proposed function, process and/or method. The processor 1010 may be configured to implement an NAS layer and an AS layer of a communication system in the wireless device 1000, and may be configured to signal a message between the NAS layer and the AS layer. The AS layer implemented by the processor 1010 may be configured to determine whether to schedule system information for EAB, whether EAB information is included when scheduled, and whether to bar accessing a cell based on contents of EAB information. The AS layer implemented by the processor 1010 may be configured to signal access barring due to EAB or signal release of access barring due to EAB to the NAS layer as a higher layer. When accessing to a corresponding cell is not barred, the AS layer implemented by the processor 1010 may be configured to establish RRC connection according to a service request from the NAS layer. The processor 1010 may be configured to implement the embodiment described above with reference to the accompanying drawings.

The RF unit 1030 may be connected to the processor 1010 to transmit and receive a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for accessing carried out by a user equipment (UE) in a wireless communication system, the method comprising:

obtaining system information from a target cell;

determining whether system information for extended access barring (EAB) has been scheduled in the system information;

when the system information for the EAB has been scheduled, determining whether EAB information is included in the system information for the EAB, which is a basis of determining whether accessing the target cell is barred on the basis of the EAB information, and when the system information for EAB has not been scheduled in the system information, determining that accessing the target cell is barred.

2. The method of claim 1, further comprising:
when it is determined that the system information for EAB has not been scheduled so accessing the target cell is barred, informing a higher layer that accessing is barred due to EAB.

3. The method of claim 1, further comprising:
when the system information for EAB has been scheduled and the EAB information is not included in the system information for EAB, determining that accessing the target cell is not barred.

4. The method of claim 3, further comprising:
when it is determined that the system information for EAB has been scheduled and the EAB information is not included in the system information for EAB so accessing the target cell is not barred, informing the higher layer that access barring due to EAB has been released.

5. The method of claim 4, further comprising:
when it is determined that accessing the target cell due to EAB is not barred, establishing radio resource control (RRC) connection with the target cell.

6. The method of claim 5, wherein establishing the RRC connection with the target cell is performed in response to a service request triggered by the higher layer.

7. The method of claim 1, wherein the UE is barred from accessing a previous cell according to previous EAB information provided from the previous cell.

8. A wireless device operating in a wireless communication system, the wireless device comprising:
a radio frequency (RF) unit configured to transmit and receive a radio signal; and
a processor functionally coupled to the RF unit,
wherein the processor is configured to implement a first layer and a second layer as a higher layer of the first layer, and the first layer is configured to obtain system information from a target cell,
determine whether system information for extended access barring (EAB) has been scheduled in the system information,
determine whether EAB information is included in the system information for EAB, which is a basis of determining whether accessing the target cell is barred on the basis of the EAB information, when the system information for EAB has been scheduled, and
determine that accessing the target cell is barred when the system information for EAB has not been scheduled in the system information.

9. The wireless device of claim 8, wherein the first layer is configured to inform the second layer that accessing is barred due to EAB when the system information for EAB has not been scheduled so accessing the target cell is barred.

10. The wireless device of claim 8, wherein the first layer is configured to determine that accessing the target cell is not barred when the system information for EAB has been scheduled and the EAB information is not included in the system information for EAB.

11. The wireless device of claim 10, wherein the first layer is configured to inform the second layer that access barring due to EAB has been released, when it is determined that the system information for EAB has been scheduled and the EAB information is not included in the system information for EAB so accessing the target cell is not barred.

12. The wireless device of claim 11, wherein the first layer is configured to establish radio resource control (RRC) connection with the target cell, when it is determined that accessing the target cell due to EAB is not barred.

13. The wireless device of claim 12, wherein establishing the RRC connection with the target cell is performed in response to a service request triggered by the second layer.

14. The wireless device of claim 8, wherein the wireless device is barred from accessing a previous cell according to previous EAB information provided from the previous cell.

* * * * *